April 26, 1960   A. W. SCRIBNER   2,934,206
APPARATUS FOR DIE EXPRESSING PLASTIC MATERIALS
Filed Sept. 24, 1957

INVENTOR
Albert W. Scribner
BY
ATTORNEY

United States Patent Office 2,934,206
Patented Apr. 26, 1960

2,934,206

APPARATUS FOR DIE EXPRESSING PLASTIC MATERIALS

Albert W. Scribner, West Hartford, Conn.

Application September 24, 1957, Serial No. 685,899

4 Claims. (Cl. 207—2)

This invention relates to a method and apparatus for die expressing plastic materials and more particularly relates to a novel method and apparatus for die expressing plastics or metals and the like so as to form a stepped extrusion; i.e. an extruded product having variable cross sectional shapes and/or areas.

The prior art methods and devices are limited in the types of stepped extrusions that may be produced. Where a plurality of extrusion dies are initially held in coaxial juxtaposition so as to be serially releasable to cause a desired change in product cross section, the dies must be stripped from the product after the die expressing operation and must thereafter be properly reassembled in the press before another extrusion cycle may take place. Furthermore, by necessity, this general method of producing stepped extrusions can be used only where the cross sectional area of the extruded product gets larger and larger, and not in the many cases where a decreasing as well as an increasing of the cross sectional area for the extruded product is desired.

One object of the instant invention is to provide an improved method and apparatus for producing elongated products of varying cross section by an extrusion operation.

Another object of the invention is to provide a novel extrusion press whereby an extrusion die which is disposed in a work receiving chamber is adapted to be moved into and out of engagement with the forward work engaging face of another extrusion die that is operatively disposed at the end of said chamber.

Another object of the invention is to provide a novel method and apparatus for die expressing plastic materials whereby the elongated extruded product has successive cross sectional areas which increase and/or decrease in size.

A further object of the invention is to provide a novel method and apparatus for producing a stepped extrusion of increasing and decreasing cross sectional areas by selectively moving at least two extrusion dies into and out of abutting relation.

Other objects will become apparent as the disclosure progresses.

The instant disclosure will be made with reference to the production of stepped extrusions whose successive cross sectional areas, although varying in size, have a circular profile. It will be understood however that the various cross sectional profiles of each extrusion may be given many different non-circular contours depending on the particular shapes of the respective die orifices used in the extrusion equipment. Further, although the instant disclosure is made with reference to the extrusion of metals, it will be understood that the principles hereinafter described apply equally well to the die expressing of various other types of formable materials.

Figure 1:
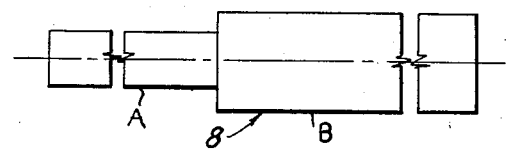
Figure 1 is a side view showing a typical stepped extrusion which may be produced by conventional die expressing operations.

The extruded product 8 shown in Figure 1 comprises two sections A and B of different cross sectional area. This type of stepped extrusion may be produced by first extruding section A and then extruding section B.

Figure 2:
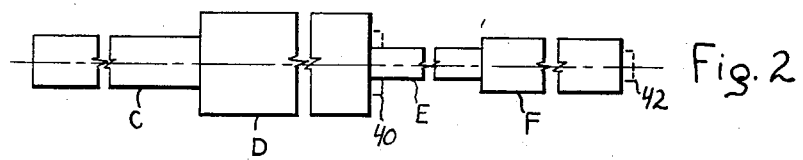
Figure 2 is a side view of a typical stepped extrusion which may be produced in accordance with the instant invention.

The integral stepped extrusion of Figure 2 comprising four sections C, D, E and F is not capable of being produced by conventional extrusion methods and apparatus in that the cross sectional areas of the successive sections C to F (or F to C) decrease as well as increase in size.

Figure 3:
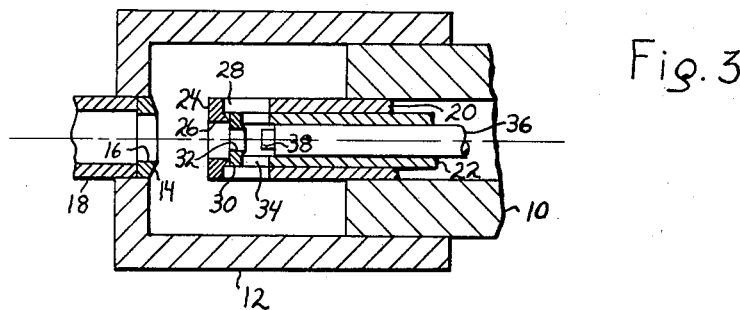
Figure 3 is an axial sectional view showing the principal parts of an extrusion press that is constructed in accordance with the instant invention.

The extrusion press shown in Figure 3 is capable of producing stepped aluminum extrusions of the type shown in Figure 2 and comprises a tubular ram 10 which is slidably mounted at the charging end of the billet receiving chamber formed in the conventionally supported container 12. An extrusion die 14 having an extrusion orifice 16 is disposed at the other end of container 12 and may be fixedly secured to said container, or may be secured to the end of the axially movable tubular die supporting plunger 18 which cooperates with an opening in said other end of container 12 and retains the die 14 in the operative position shown in Figure 3. Telescopically mounted in the tubular working ram 10 is a pair of tubular die supporting plungers 20 and 22. An extrusion die 24 having an orifice 26 is secured to the inner or left end of plunger 20. A plurality of circumferentially spaced elongated apertures or slots 28 are formed in and through the walls of said tubular plunger 20; said slots being disposed adjacent the entrance to said die orifice 26. An extrusion die 30 having an orifice 32 is secured to the inner or left end of the plunger 22. A plurality of circumferentially spaced elongated apertures or slots 34 are formed in the walls of said plunger 22; said slots 34 being disposed adjacent the entrance to said die orifice 32 and being in registry with the respective slots 28 formed in the plunger 20 when the parts are in the positions shown in Figure 3. Slidably mounted in the tubular plunger 22 is a ram 36 having a cut-off tip 38. The cross sectional size and shape of said tip 38 corresponds to that for said die orifice 32 and is adapted to be moved into the latter for purposes to be subsequently described.

The rams 10 and 36 and the plungers 18, 20 and 22 may be power actuated by any suitable means such as conventional type hydraulic motors having the necessary controls for effecting the desired sequential operation of said rams and plungers. The respective sizes of the die orifices 16, 26 and 32 progressively decrease in that order.

Figure 4:
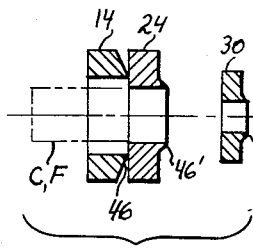
Figures 4, 5 and 6 are diagrammatic views illustrating one sequence of operation of the parts of the press shown in Figure 3.
Figure 5:
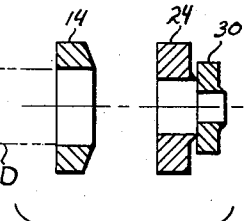
Figure 6:
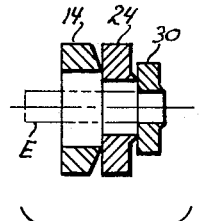

Figures 4–6 illustrate one particular sequence for the actuation of ram 10 and the plungers 20 and 22, this sequence being that for die expressing the stepped extrusion of Figure 2. Here the sections C, D, E and F will be respectively and serially formed by the dies 24, 14, 30 and 24.

The rams 10 and 36 and plungers 20 and 22 are first withdrawn and a tubular work billet inserted in the container 12. Said plungers 20, 22 and the ram 36 are then returned to their respective positions shown in Figure 3 and the ram 10 is moved into engagement with the adjacent end of said billet. Before the working stroke of ram 10 commences, the plunger 20 is advanced so that the rearward face of the die 24 is positioned in abutting relation with the forward work engaging face of the die 14 as illustrated in Figure 4. The ram 10 then commences its working stroke and forces the work metal to flow through the apertures 28 and out through the die orifice 26, thereby forming the section C, Figure 4, of the stepped extrusion of Figure 2. During this period some of the work metal will flow through the orifice 32 and through the slots 34 to fill the space between the die 30 and the ram 36.

After the desired length of section C has been extruded and the section D is to be die expressed, the plunger 20 is moved to the right, away from the die 14, as illustrated in Figure 5, thereby allowing the work material to be formed thereafter by the die orifice 16. After the desired length of section D has been thus extruded and it is desired to die express the section E the plungers 20 and 22 are both moved to the left so that all three dies 14, 24 and 30 are positioned in abutting relation, as illustrated in Figure 6, thereby allowing the work metal to flow through slots 28 and 34 and to be formed by the die orifice 32. When the section F, which has a cross sectional area which is the same as that for section C, is to be die expressed the plunger 22 is moved to the right so that the three dies are again in the respective positions shown in Figure 4. When the die expressing of the stepped extrusion of Figure 2 has been completed the die plungers 20 and 22 are moved to the positions shown in Figure 6 and ram 36 is advanced so that the ram tip 38 enters the die orifice 32 to thereby sever the stepped extrusion from the remaining unextruded portion of the work metal. If critical, any undesired obstructing or excess material at the section transition points as indicated by the dotted lines 40 of Figure 2 may be removed by a machining operation. Several similar recurrent stepped extrusions may be serially formed in one extruded product which may then be cut into the desired lengths so as to form a plurality of similar articles.

During the above described extrusion operation the main working ram 10 moves continually and the ram 36 is moved with the plunger 22 so as to remain in substantially fixed relation with the latter until ram tip 38 is moved into the extrusion orifice 32. An axial tension force may be applied to the end of the extruded portion of the work metal so as to assist in the die expressing of the remaining portion of the stepped extrusion. It will be noted that the dies 14, 24 and 30 have projections 46, 46' and 46", Figure 4, respectively formed on the forward faces thereof. When the dies are selectively moved into longitudinally aligned and abutting relation, as illustrated in Figures 4-6, each of these projections 46, 46' and 46" will assist in cutting off the radial inward flow of the work material over the faces of the respective dies.

Various modifications may be made in the construction and operation of the press shown in Figure 3. For example, a second set of two or more die supporting plungers, similar to plungers 20 and 22, may be operatively mounted at the left end of the container 12 so as to increase to four or more the number of cross sectional sizes which may be imparted to the extruded product. A conventional type mandrel may be used with the instant apparatus in order to extrude tubular products having varying outside circumferences. Likewise a screw type of ram means may be used instead of the axially movable ram 10. The principles of the instant invention may be utilized in the construction of cable sheathing presses of the opposed plunger type wherein the axes of the die supporting plungers will be perpendicular to the axes of the opposed billet working rams. In the operation of the press of Figure 3 the working stroke of the ram 10 may be slowed down or stopped during the transition in the extrusion stages, i.e. during the period when the die supporting plungers 20 and 22 are being moved as shown in Figures 4-6. The ram 36 may be effectively eliminated by making solid that portion of the plunger 22 which is located to the right of the slots 34; the finished stepped extrusion then being completed with an end section as illustrated at 42, Figure 2, which may be severed by conventional type cropping or cutting means. If the stepped extrusion to be formed has only two different sized sections, then the plunger 22 and the ram 36 may be deleted and the plunger 20 may be provided with a ram similar to ram 36; or that portion of plunger 20 which is to the right of the slots 28 may be made solid.

Having illustratively described the principles of the invention, I claim:

1. In an extrusion press: a container having a work receiving chamber formed therein; a first die operatively mounted at one end of said chamber and having an extrusion orifice formed therethrough; an extrusion ram movably mounted in said container at the other end of said chamber and adapted to displace work material in said chamber towards and through said die orifice; a die supporting plunger movably mounted in said container and having an inner end that is operatively disposed in said chamber between said extrusion ram and said first die; a second die, having an extrusion orifice formed therethrough, operatively mounted on said inner end of the plunger; said plunger having openings through the sides thereof near said inner end so that work material may flow from said chamber through said second die; said plunger being constructed and arranged to move the rearward face of said second die into and out of abutting relation with the forward work engaging face of said first die so that the work material may be extrusion formed by said second and said first dies respectively upon operation of said ram thereby producing an extrusion of varying cross section.

2. In an extrusion press; a container having a work receiving chamber formed therein; a first extrusion die operatively mounted at one end of said container and having an orifice formed therethrough; a main ram means movably mounted at the other end of said chamber and adapted to displace work material in said chamber towards and through said extrusion die; a die supporting plunger operatively mounted in said container; a second extrusion die operatively mounted on the inner end of said plunger and having an orifice formed therethrough which is smaller in size than the orifice formed in said first die; said inner end of said plunger being disposed in said container between said ram means and said first die and being formed so that work material in said chamber may flow towards and through said second extrusion die; said plunger and said first extrusion die being supported and arranged for relative axial movement for moving the rearward face of said second die and the forward work engaging face of said first die into and out of abutting relation so that the work material in said chamber in being displaced by said ram means may be extrusion formed by said second die and said first die respectively thereby producing an integral extrusion of increasing and decreasing cross sectional size.

3. Apparatus as defined by claim 1; additionally comprising a ram mounted substantially coaxially within said plunger and having a tip adapted to impede the flow of work material through said dies.

4. In an extrusion press: a container having a work receiving chamber formed therein; a first extrusion die operatively mounted at one end of said container and having an orifice formed therethrough; a main ram means movably mounted at the other end of said chamber and adapted to displace work material in said chamber towards and through said extrusion die; a die supporting plunger operatively mounted in said container; a second extrusion die operatively mounted on the inner end of said plunger and having an orifice formed therethrough which is smaller in size than the orifice formed in said first die; said inner end of said plunger being disposed in said container between said ram means and said first die and being formed so that work material in said chamber may flow towards and through said second extrusion die; said plunger and said first extrusion die being supported and arranged for relative movement for moving the rearward face of said second die and the forward work engaging face of said first die into and out of abutting relation so that the work material in said chamber in being displaced by said ram means may be extrusion formed by said second die and said first die respectively; a second die supporting plunger slidably mounted for movement relative to the first mentioned plunger; a third extrusion die operatively mounted on the inner end of said second plunger; said inner end of said second plunger being formed so that work material in said chamber may flow towards and through said third extrusion die; said second plunger being constructed and arranged to move the rearward face of said third die into and out of engagement with the forward work engaging face of said second die so that when said first and second dies are in said abutting relation the work material in said chamber in being displaced by said ram means may be extrusion formed by said third and second dies respectively thereby producing an extrusion of varying cross sectional size.

References Cited in the file of this patent

UNITED STATES PATENTS

| | | |
|---|---|---|
| 434,866 | Goodwin | Aug. 19, 1890 |
| 493,945 | Robertson | Mar. 21, 1893 |
| 2,231,336 | Heron | Feb. 11, 1941 |
| 2,715,459 | Krause | Aug. 16, 1955 |
| 2,740,635 | O'Toole | Apr. 3, 1956 |

FOREIGN PATENTS

| | | |
|---|---|---|
| 544,114 | Great Britain | Mar. 27, 1942 |
| 844,287 | Germany | July 17, 1952 |